US012744793B2

(12) United States Patent
Boyer et al.

(10) Patent No.: US 12,744,793 B2
(45) Date of Patent: Sep. 22, 2026

(54) CYBERSECURITY COMPONENTS COMMUNICATING AND COOPERATING WITH ONE OR MORE LARGE LANGUAGE MODELS

(71) Applicant: Darktrace Holdings Limited, Cambridge (GB)

(72) Inventors: John Boyer, Cambridge (GB); Justas Zaborovskis, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 15 days.

(21) Appl. No.: 18/737,542

(22) Filed: Jun. 7, 2024

(65) Prior Publication Data

US 2024/0414211 A1 Dec. 12, 2024

Related U.S. Application Data

(60) Provisional application No. 63/472,227, filed on Jun. 9, 2023.

(51) Int. Cl.

*G06F 21/00* (2013.01)
*G06F 40/58* (2020.01)
*H04L 9/40* (2022.01)

(52) U.S. Cl.

CPC .......... *H04L 63/1416* (2013.01); *G06F 40/58* (2020.01); *H04L 63/1425* (2013.01); *H04L 63/1441* (2013.01); *H04L 63/205* (2013.01)

(58) Field of Classification Search

CPC ............. H04L 63/1416; H04L 63/1425; H04L 63/1441; H04L 63/205; H04L 63/1433; G06F 40/58

See application file for complete search history.

(56) References Cited

U.S. PATENT DOCUMENTS

| | | | | |
|---|---|---|---|---|
| 2020/0177612 | A1* | 6/2020 | Kras | G06N 20/00 |
| 2021/0273961 | A1* | 9/2021 | Humphrey | G06N 7/01 |
| 2022/0038489 | A1* | 2/2022 | Thakur | G06N 3/088 |
| 2023/0315856 | A1* | 10/2023 | Lee | G06N 3/08 |
| 2024/0281668 | A1* | 8/2024 | Lev | G06F 40/35 |
| 2024/0403792 | A1* | 12/2024 | Goutal | G06Q 10/06398 |

* cited by examiner

*Primary Examiner* — Michael M Lee

(74) *Attorney, Agent, or Firm* — Rutan and Tucker, LLP

(57) ABSTRACT

Cybersecurity components configured to cooperate with LLMs including i) a cyber security appliance with a cyber threat detect engine to detect a cyber threat, ii) a proactive threat notification service, iii) a cyber threat autonomous response engine, iv) a cyberattack simulator, v) a cyberattack restoration engine, and vi) an artificial intelligence-based cyber threat analyst module. The LLMs are configured to communicate and cooperate with the one or more cybersecurity components via one or more Application Program Interfaces (APIs) to receive cyber security information being produced by the one or more of the cybersecurity components and then to apply language generation functionality in order to assist a human in an understanding of the cyber security information being produced by the cybersecurity components, and then also to provide recommendations to prioritize breaches over other breaches in a native human friendly format for the human.

18 Claims, 7 Drawing Sheets

FIG. 4 Network

CYBERSECURITY COMPONENTS COMMUNICATING AND COOPERATING WITH ONE OR MORE LARGE LANGUAGE MODELS

RELATED APPLICATION

This application claims priority under 35 USC 119 to U.S. provisional patent application 63/472,227, titled "CYBER SECURITY SYSTEM" filed Jun. 9, 2023, which the disclosure of such is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cyber threat against the enterprise network, one or more computing devices connected to the enterprise network, stored or in-flight data accessible over the enterprise network, and/or other enterprise-based resources. This cyber threat may involve malware (malicious software) introduced into a computing device or into the network. The cyber threat may originate from an external endpoint or an internal entity (e.g., a negligent or rogue authorized user). The cyber threats may represent malicious or criminal activity, ranging from theft of credential to even a nation-state attack, where the source initiating or causing the security threat is commonly referred to as a "malicious" source. Conventional cybersecurity products are commonly used to detect and prioritize cybersecurity threats (hereinafter, "cyber threats") against the enterprise, and to determine preventive and/or remedial actions for the enterprise in response to those cyber threats.

SUMMARY

Methods, systems, and apparatus are disclosed for an Artificial Intelligence-based cyber security system.

One or more cybersecurity components configured to cooperate with one or more large language models including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days. The large language models are configured to communicate and cooperate with the one or more cybersecurity components via one or more Application Program Interfaces (APIs) to receive cyber security information being produced by the one or more of the cybersecurity components and then to apply language generation functionality in order to assist a human in an understanding of the cyber security information being produced by the cybersecurity components, and then also to provide recommendations to prioritize breaches over other breaches in a native human friendly format for the human.

These and other features of the design provided herein can be better understood with reference to the drawings, description, and claims, all of which form the disclosure of this patent application.

DRAWINGS

The drawings refer to some embodiments of the design provided herein in which:

FIG. 1 illustrates a diagram of an embodiment of one or more cybersecurity components configured to cooperate with one or more large language models (LLMs) including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days.

FIG. 2 illustrates a block diagram of an embodiment of one or more LLMs that have been trained on an API specification for one or more of the cyber security components so that the LLMs can understand how to make API requests and translate at least one of i) a user question and ii) a question by the LLM itself into API queries into the one or more cyber security components of the cyber security system to explain a decision process of the machine learning from within that cyber security component as well as explain a cyber security incident in the native human friendly format for that human.

Figure 6:
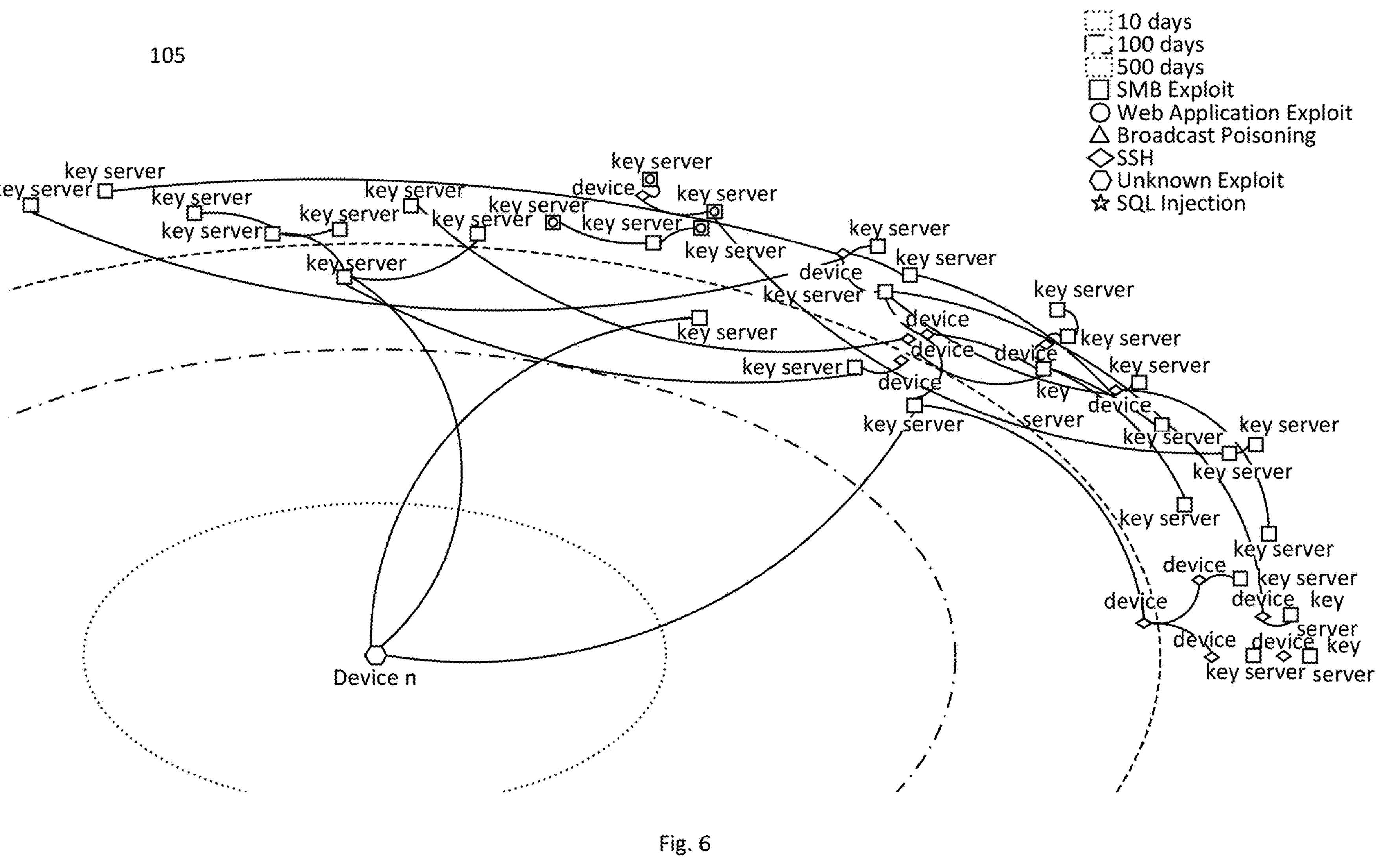

FIG. 6 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks.

Figure 7:
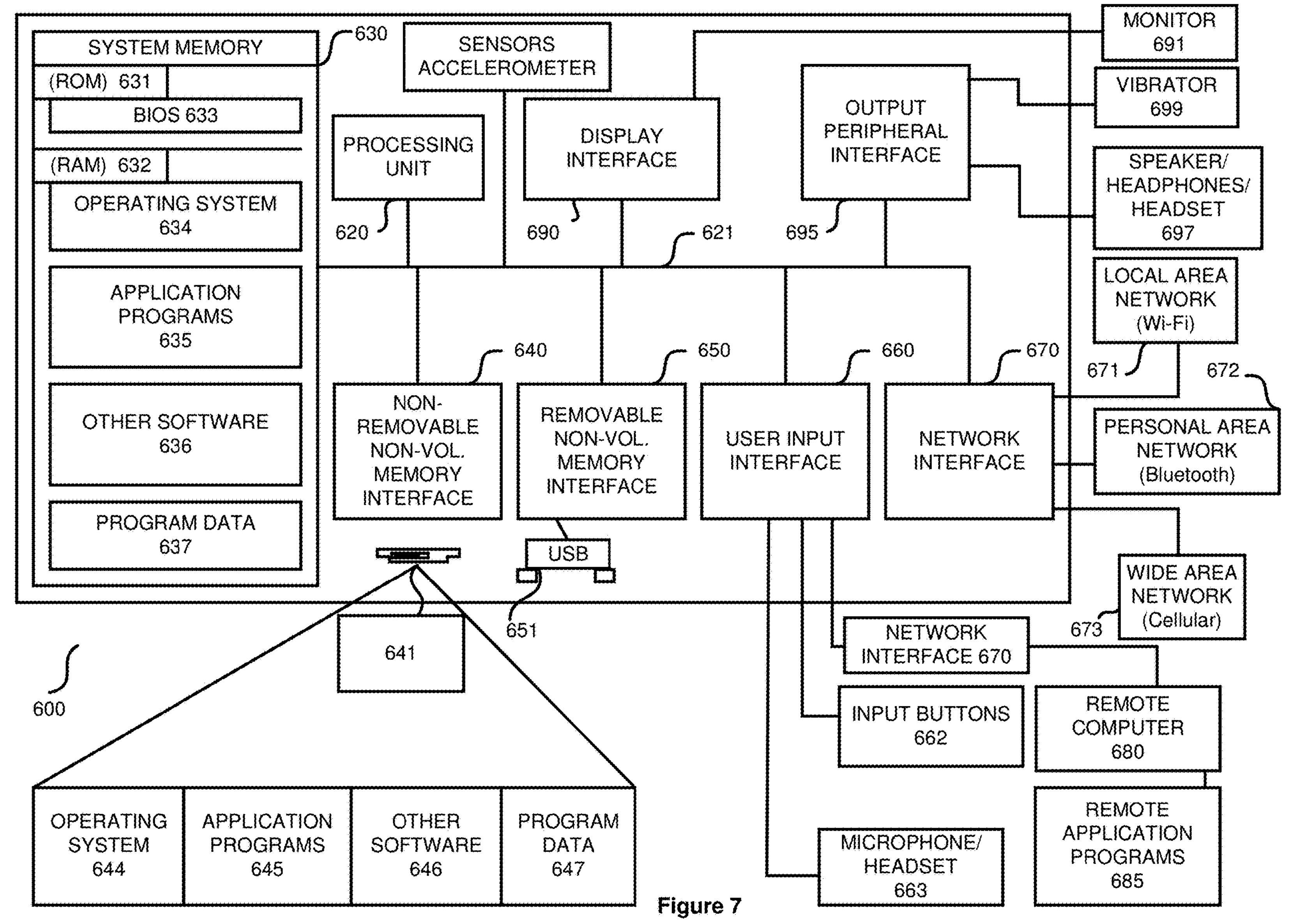

FIG. 7 illustrates a block diagram of an embodiment of one or more computing devices that can be a part of the Artificial Intelligence-based cyber security system including the multiple Artificial Intelligence-based engines and LLMs discussed herein.

While the design is subject to various modifications, equivalents, and alternative forms, specific embodiments thereof have been shown by way of example in the drawings and will now be described in detail. It should be understood that the design is not limited to the particular embodiments disclosed, but-on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
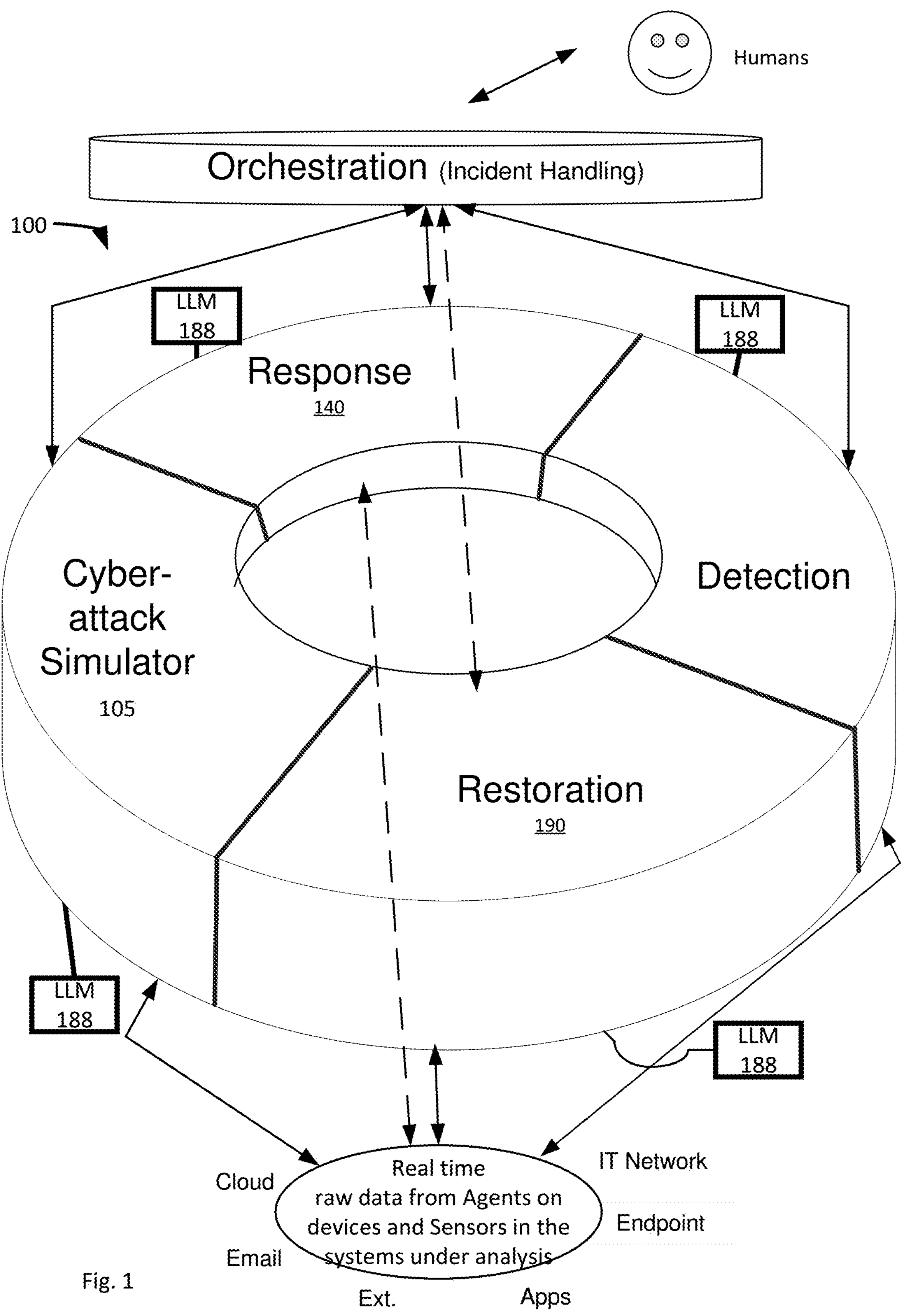

FIG. 1 illustrates a diagram of an embodiment of one or more cybersecurity components configured to cooperate with one or more large language models (LLMs) including i) a cyber security appliance with a cyber threat detect engine to detect a cyber threat in one or more of an email system, an Information Technology network, a cloud network, and any combination of these, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more minor anomalies linked to each other over a time frame of examination spanning two or more days.

The LLMs 188 communicate and cooperate with the one or more cybersecurity components via one or more Application Program Interfaces (APIs) to receive cyber security information being produced by the one or more of the cybersecurity components and then to apply language generation functionality in order to assist a human in the understanding of the cyber security information being produced by the cybersecurity components, and then also to provide recommendations to prioritize breaches over other breaches as well as on an order sequence to action items, all in a native human friendly format for the human.

The one or more LLMs 188 are trained to do tasks on behalf of a user and provide human readable summaries, including i) summarization and prioritization of breaches, ii) launch an investigation using the one or more APIs to find out all of this information, and then iii) utilizing the language capabilities of the LLM 188 to rephrase existing textual material to make the information more readily understandable to a larger audience of human end users. The LLM 188 is then trained to produce a report because the LLM 188 has received as an input and/or fetched machine outputs including incident reports. Once the LLM 188 performs the task of investigating and obtaining the existing material, then the LLM 188 analyses the already compiled information from the data that cyber security component such as the cyber security appliance 100 with a cyber threat detect engine, the cyber threat autonomous response engine 140, the cyberattack simulator 105, the cyber-attack restoration engine 190, etc., created, but the data and incident reports are specialized to technical end users and now the LLM 188 rephrases and enhances that existing material to make the information more readily understandable to a larger audience of end users.

The LLM(s) 188 can launch an investigation using the one or more APIs to find out information. An LLM 188 can be trained on an API specification for one or more of the cyber security components so that the LLM 188 can understand how to make API requests. The training can include training on capabilities of each of the one or more of the cybersecurity components including what type of information can be found by communicating with each particular cybersecurity component as well as how to get that information through the API request. The LLM(s) 188 is trained on an API spec (API schema, API supported format, procedures, etc.) on the details of the API as well as how and why to grab information from specific cyber security components. Individual LLMs 188 can be trained on the API specification on how to get that information and where to get that information from specific cyber security components. The individual LLMs 188 can be trained on talking to the API to one or more of the cyber security components. Another LLM 188 can be trained as an orchestrator to talk to the APIs from one or more organizations external to the local cyber security system as well as to all of the individual LLMs 188 each talking to their one or more APIs to specific cyber security components. Each cyber security component must have its API specification to be known to the LLM 188 or at least have its API accessible for a trusted party partner in order to train on that API. The LLM 188 is trained to interact with a module within a cyber security component or other cyber security component in a predefined, structured format in order to ensure that the LLM 188 follows a set of steps which mimic human workflow and/or follows a certain set of steps to keep the LLM 188 on track within guardrails of operations and communications allowed. The LLM 188 is trained to have a semi-structured interaction between two machine learning components that are almost talking to one another because the LLM 188 receives an input of instruction from this module. An orchestration module and/or trained orchestration LLM 188 can help the other LLMs 188 for the set of steps, such as a series of preexisting steps that allows a number of branching options, to keep the other LLMs 188 on track within guardrails of operations and communications allowed. The instructions follow a very predefined format which allows one to essentially prompt or interact with the LLM model 188 without actually being human by chatting in a machine format.

The LLM model 188 is trained from scratch and/or fine-tuned/refined so that the LLM 188 can take in an API specification including its description and turn that API specification into a format that into a series of steps of functional code. For example, a first piece of code in LLM 188 after taking in the API specification can call endpoints, via the API for that endpoint, when it is given the endpoint name and parameters. Thus, a LLM 188 can be trained, including mere fine-tune training, for the task of launching an investigation using the one or more APIs to find out information to take in a specification description of one or more of the APIs and a user input (e.g. query) and turn the specification of one or more of the APIs into a set of endpoints and their associated parameters and available information that the trained deep learning model in the LLM 188 will then use to call the cybersecurity components. In an embodiment, one LLM 188 is trained on all of the APIs of the cyber security components. In an embodiment, one LLM 188 is trained on all of the APIs of the cyber security components from a specific organization, and another LLM 188 is trained on all of the APIs of the cyber security components from a second organization. In an embodiment, each LLM 188 is trained on a per API basis for a specific cyber security component. Similar training is performed for an LLM 188 on the task of summarization and prioritization of breaches. Similar training is performed for an LLM 188 on the task of utilizing the language capabilities of the LLM 188 to rephrase existing textual material to make the information more readily understandable to a larger audience of human end users.

The LLM 188 can utilize the language capabilities of the LLM 188 to rephrase existing textual material to make the information received from the cyber security components more readily understandable to a larger audience of human end users. The LLM 188 can apply summarization functionality and/or rephrasing functionality to make cyber security data more understandable by rephrasing this complex information from the cyber security components and potentially drawing upon other contextual data sources during that rephrasing in order to make the LLM's output more compelling and understandable to a number of individuals, whether that's new users, nontechnical users, or even people who just need to acquire more time in their day by having that data pre-prepared, and expanded upon for them.

In addition, the LLM 188 has been trained on an API specification for one or more of the cyber security components so that the LLM 188 can understand how to make API requests in the investigation to help explain both i) a decision-making process of one or more of the cyber security components as well as ii) cyber security jargon and concepts to enhance transparency and trust.

The LLM 188 receives a machine's output from one or more of the cybersecurity components, which could be in a JSON format, log of data format, or even a more friendly human readable format, etc., and then the LLM 188 has been trained to follow a series of steps in order to produce a more understandable report to the human by obtaining additional information through the APIs to different sources of information. The LLM 188 analyzes an initial information outputted by one or more of the cybersecurity components and then attempts to translate/rephrase initial information outputted by one or more of the cybersecurity components, supplemented by the additionally obtained information, into a report that is easier for most humans to understand in the native human friendly format.

The LLM 188 rephrases cyber security information, technical jargon and cyber security specific technical data using Natural Language Processing abilities of a trained LLM 188 into a human readable and understandable output. The LLM 188 reframes existing text in a technical cyber security format with technical jargon and cyber security specific technical data into the natural human language that is more understandable by an end user who may not be familiar with the technical jargon and cyber security specific technical data, in order to explain, prioritize, and contextualize cybersecurity data for a wider range of individuals. The wider range of individuals may include end users outside of the cyber security team. The large language model 188 can take some JSONs and turn that into an understandable list of issues and a summary in a native human friendly format. In addition, the LLM 188 takes a bunch of data that was intended to be shown to a person in an explainable format, and utilizes a form of artificial intelligence to reframe that data for a number of different audiences, whether it's a new user who does not understand, for example, what HTTP is and what a SSH compromise is, or an organization's IT team trying to understand why they should care. The LLM 188 has been trained to do textual analysis on cyber security information, technical jargon, and cyber security specific technical data (essentially outputted by a machine) that has already been produced by one or more of the cybersecurity components and then the LLM 188 applies summary and rephrasing functionality, for example, to rephrase that information into a format and with more universally understood words in a sentence structure, reinforced with additional sentences that contain explanations of the technical jargon and cyber security specific technical data that the human can more readily understand, rather than communicating just raw technical data and technical jargon produced by an initial machine's output. The LLM 188 will then produce a formal report containing that summarized and rephrased information.

Note, the large language model's 188 ability to rephrase cybersecurity data for an alternative audience is functionally different rather than merely utilizing a LLM to generate a summary of that data for the existing technical audience.

In an embodiment, the LLM 188 receives a machine's output from the cybersecurity components and makes each point/issue in the machine's output into a sentence as well as then finds technical jargon and inserts words with that technical jargon to explain what is being conveyed in much less technical terms. The LLM 188 looks at an existing summary in the machine output, the specific device IDs involved, the model breaches involved, and then queries those devices and/or a storage device with data on those devices' IDs and model breaches to obtain additional contextual data on each specific device as well as the incident(s) being discussed in the summary. The LLM 188 can then be also trained to find some additional information about the incident and model breaches whether the cyber security appliance 100 or other 3rd party service has classified this incident/event as part of a named cyber threat and whether any actions have been taken to in response to this incident to mitigate the cyber threat, etc. The LLM 188 gets additional information about the incident as well as additional information on any of the devices involved in the incident.

The LLM 188 can also get additional information about the reputations of host names and/or other threat intelligence available about this incident from third party's sources. Once the LLM 188 has all of this additional information about the machine's output on the incident, the model breaches, and the devices involved, then the LLM 188 can start formulating to produce a final summary of this incident with the additional contextual information. The LLM 188 can make individual sentences on each point and explain technical jargon in much less technical terms with words that are more widely understood by the public in general, and/or can add in a sentence/definition to explain what the technical jargon means/conveys. Once that final summary is produced, then the LLM 188 performs one more additional task of adding any conclusions drawn by the LLM 188 as an additional comment to the summary about the incident report, such as a priority of action item information, etcetera. Thus, the LLM 188 has been trained to utilize a pre-existing human readable corpus of cybersecurity data prepared with an intention of human consumption. And then, the LLM 188 has been configured to receive that corpus of cybersecurity data prepared for human consumption as the input to the LLM 188 in order to produce a summarization and rephrasing of the corpus of cybersecurity data in the native human friendly format for a consumption of audiences consisting of at least two more levels of cyber security sophistication. A primary benefit is that it allows cyber security system operators to explain the ongoing incidents to different levels of end users with cyber security knowledge without requiring human time to rephrase that data, and present that data to explain things such as why the network was breached.

The LLM 188 may produce a report with a final summary after performing the tasks of launching an investigation using the one or more APIs to find out information, and then utilizing the language capabilities of the LLM 188 to rephrase existing textual material to make the information more readily understandable to a larger audience of human end users. The final summary with additional conclusions generated by the LLM 188 may be, for example, as follows.

"The following observations have been combined across several sources of information including the artificial intelligence-based cyber threat analyst module 120, Microsoft Defender, and other information from the cyber security appliance 100. The observations and critical information are as follows. The incidents involved multiple devices within the network suggesting a widespread compromise is in progress. The devices were used for various malicious activities including network reconnaissance from user 543 on his device accessing a website. Next, lateral movement by the malicious cyber threat spread from device X utilized by user 543 over to devices Y and Z, which then resulted in a data exfiltration from user 543 over to a known malicious website, which obtained that data as well as various command and control communications between all the above devices and the following known malicious websites A, B, and C. Most of the external hosts involved in the incident do have a known malicious reputation. However, there was one external host, host D, which does not currently have a known malicious reputation but their role and the nature of their involvement in this incident suggest that you should be investigated further.

In summary, critical information includes that multiple devices within the network have been compromised these devices were used for various malicious activities including data exfiltration as well as network cognizance. Most of the external host involved in the incidents have a known reputation but others need further investigation. The main goal of this attacker and their motivation seems to be to gain a foothold within the network and then move laterally to compromise multiple devices before any detection occurs, and then exfiltrate as much sensitive data and was specifically targeted on the sensitive data for financials in this attack as well as maintain command and control communication for future attacks between external hosts and the compromised devices. The next steps and recommendations to resolve this incident would be to isolate and clean the known affected devices as well as investigate the external host that does not have the yet known malicious reputation as well as put in additional blocks between communications going to the external hosts."

A report supplied to the LLM 188 may have initially been as follows.

"Device X was compromised for network reconnaissance. Next, devices Y and Z were compromised from device X. A data exfiltration occurred for user 543 over to URLs associated with websites A, B, and C."

In the above example report, the one or more large language models 188 communicated and cooperated with the one or more cybersecurity components via one or more APIs to perform the tasks of launching an investigation using the one or more APIs to find out additional information, and then utilizing the language capabilities of the LLM 188 to rephrase existing textual material to make the information more readily understandable to a larger audience of human end users. The LLM 188 received the initial report of a machine's output of an incident or chain of incidents usually intended for a cyber security team member to understand this summary from one or more of the cybersecurity components.

In the example below, the one or more large language models 188 communicate and cooperate with the one or more cybersecurity components via one or more APIs to perform the tasks of launching an investigation using the one or more APIs to find out information, and then utilizing the language capabilities of the LLM 188 to rephrase existing textual material to make the information more readily understandable to a larger audience of human end users. In this next example, the artificial intelligence-based cyber threat analyst module 120 may provide the following.

"On Monday, April 17th a suspicious chain of administrative connections was detected from users X and Z. Additionally, on that Monday, April 17$^{th}$, an unusual set of SSH connections were made by devices associated with users X and Z. Additionally, the following day on the 18th of April an internal download and an external upload happened, which user X has never done before. Also, on that same day, Tuesday, the 18$^{th}$, for the other user, user Y, an unusual internal download occurred, and the data was encrypted."

The summary may not even have the *nexus* link between these five cyber incidents. Instead, the machine's output report could just list these five cyber incidents among thirty or so cyber incidents occurring over the past two days.

The one or more LLMs 188 then perform the tasks of continuing the investigation using the one or more APIs to find out information, and then utilizing the language capabilities of the LLM 188 to rephrase existing textual material to make the information more readily understandable to a larger audience of human end users to produce its own rephrased summary. The final summary with additional conclusions generated by the LLM 188 may be, for example, as follows.

"Recent cyber incidences have revealed a complex and multifaceted threat landscape the incidents involved a series of unusual network activities and data transfers suggesting a well-coordinated attack is in progress the incidences began with a chain of administrative connections between multiple devices followed by unusual internal SSH connections. The incidents for the suspicious chain of administrative connections between multiple devices occurred around the same time. On Monday, April 17th a suspicious chain of administrative connections was detected from users X and Z. Additionally, on that Monday, April 17$^{th}$, an unusual set of SSH connections were made by devices associated with those same two users. The unusual internal SSH connections were made by one of our servers to a range of devices. These activities suggest that the devices might have been compromised and used for network reconnaissance and possibly for command and control communication with external malicious servers. This also suggests that the attackers were able to gain initial access and then move laterally within the network. The next stage of the attack involved unusual data transfers. One device was observed downloading a large amount of data from an internal device and then uploading that data and exfiltrating it to an external endpoint. On the 18th of April, an internal download and an external upload happened which user X has never done before. The desktop for user X was observed downloading a large amount of data from an internal device and then uploading a significant portion of it to an external endpoint. This desktop was also observed making an HTTP connection to a rare external endpoint. These activities suggest that this device might have been used for data exfiltration. This could indicate that this data model X filtration was a main goal of the attack with a serious concern that it has led to the loss of sensitive information. An investigation reveals that the information uploaded most likely it was related to employees' personal information. In addition, there were signs of potential data encryption activities suggesting that the possibility of a ransom attack could be imminent or in progress. On Tuesday, the 18th of April for the other user, user Y, an unusual internal download occurred, and the data was encrypted. This could have severe implications including the disruption of business operations and potential financial loss. In conclusion, the incident represents a significant circularity threat with potential impacts including data loss operational disruption of the business and reputational damage to the business due to way potential ransomware attack.

The incidents appear to be associated with multiple threat actors, including Cadet Blizzard, Onyx Sleet, and Storm-0506. Cadet Blizzard is a Russian GRU sponsored threat group known for compromising networks and maintaining a foothold for months, often exfiltrating data prior to disruptive actions. Onyx Sleet is a North Korea-affiliated activity group known for targeting military, defense, and technology industries. Storm-0506 is a cybercriminal group known to deploy ransomware and historically relied on initial access from other intrusions.

Action Plan

Given the nature of the incidents and the potential for data exfiltration, there may be legal and regulatory implications. Depending on the nature of the data involved, we may need to comply with data breach notification laws and regulations. We may also need to engage legal counsel to advise on potential liabilities and to liaise with law enforcement agencies. Our compliance team will need to conduct a thorough review to ensure we meet all our obligations.

We suggest several steps to address the threat. This includes conducting a thorough investigation to understand the full scope of the compromise, remediating the affected systems, and enhancing our security measures to prevent future incidents. Isolate the compromised devices. Patch the vulnerabilities as identified below. Implement a stricter access control and monitoring program to prevent similar incidents of unauthorized access into this sort of material. We anticipate that the threat actors may attempt to escalate their activities now that we are aware of their presence, so we will be closely monitoring our systems for any signs of escalation.

We may need additional resources or support from the executive team to implement these measures, including budgetary requirements for additional security tools and personnel. The relevant stakeholders include all departments within our organization, and we will keep them informed through regular updates.

We may also need to consider organizational policy changes to mitigate future risks. This could include stricter access controls, enhanced monitoring of network traffic, and regular security awareness training for all staff."

Thus, the LLMs 188 have been trained to create a re-summarization that adds contextualization, ease of understanding, and then action items to take and a priority in which to take those action items. The LLM 188 cooperates with one or more of the cybersecurity components to create an enhancement to the end user by performing the tasks of i) summarization and prioritization of breaches, ii) launching an investigation using the one or more APIs to find out information, and then iii) utilizing the language capabilities of the LLM 188 to rephrase existing textual material by providing a simplified workflow for an operator of a cyber security system, offloading manual activity that they would perform within that user interface by clicking on various buttons, and/or offloading value judgments that they would make about what they should prioritize that is offloaded to this machine learning component of the LLM 188 to make the initial suggestion and explanation. The LLM 188 cooperating with one or more of the cybersecurity components allows lower skilled cyber security users to act as highly skilled cyber security users effectively. The LLM 188 cooperating with one or more of the cybersecurity components allows a tier one level cyber security user and allows them to act as a tier two cyber security user.

The LLM 188 has been thoroughly trained on cyber security terminology, incident investigation flow steps, how to access and obtain information from other cyber security components through the APIs. Also, the LLM 188 has a user interface to allow a user to query it with questions and the LLM 188 will produce a response. The LLM 188 produces and presents information in a way that most tier one level cyber security users could not do without a significant time investment (which they do not normally have that much free time) as well as allows them to get more value out of what we can detect because they can more rapidly get a better understanding of it. The explainability angle is more taking the workflow actions that a more experienced analyst would perform, automating those or allowing a machine to select the most appropriate next steps, and then providing a human readable summary of what a human would have done. In this example, the LLM provides its summary to a lower skilled user, so that they either do not have to do those tasks, or they would not have thought of them before.

Figure 2:
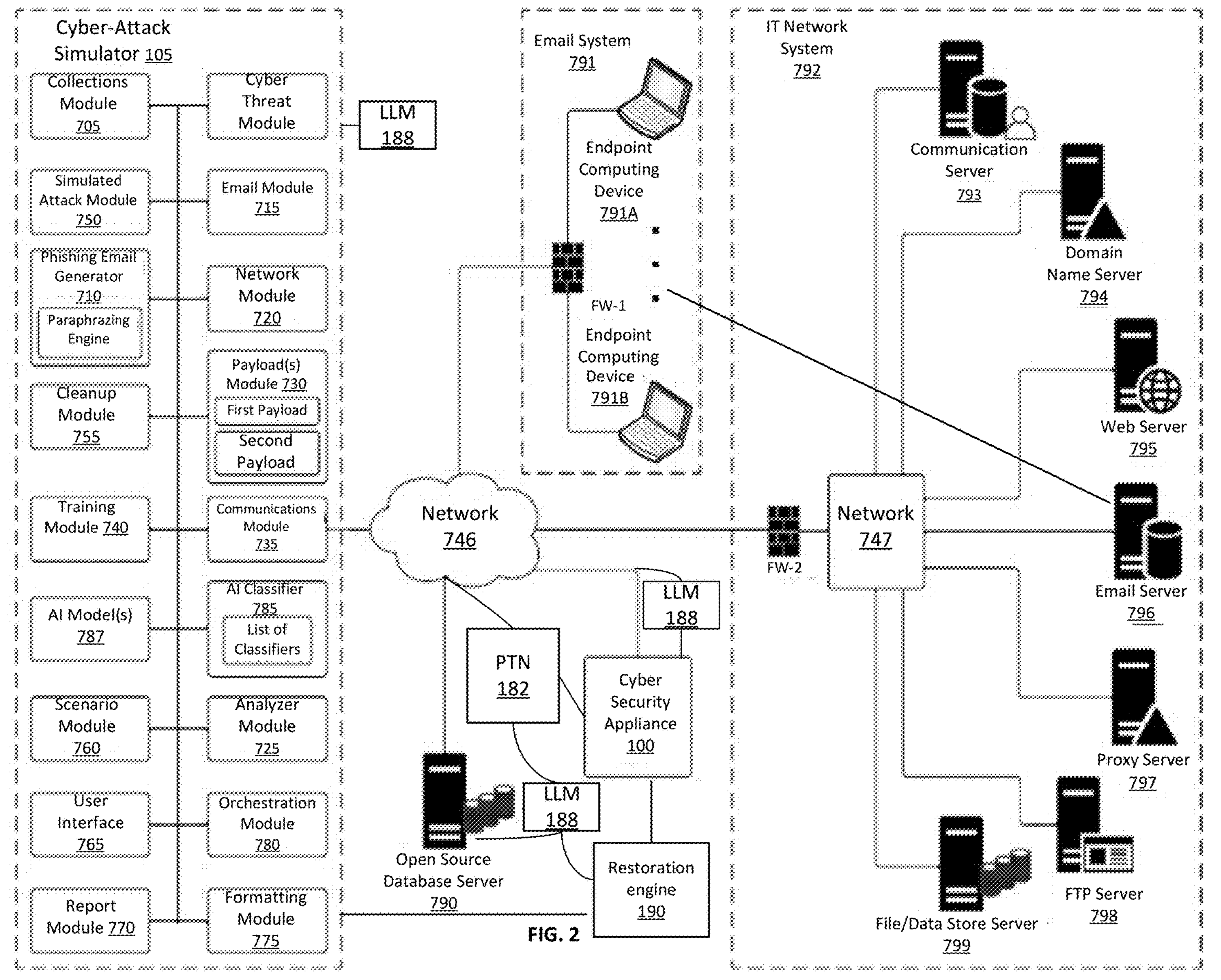

FIG. 2 illustrates a block diagram of an embodiment of one or more LLMs that have been trained on an API specification for one or more of the cyber security components so that the LLMs can understand how to make API requests and translate at least one of i) a user question and ii) a question by the LLM itself into API queries into the one or more cyber security components of the cyber security system to explain a decision process of the machine learning from within that cyber security component as well as explain a cyber security incident in the native human friendly format for that human. FIG. 2 shows the LLMs 188 cooperating and communicating with a number of cyber security components including i) a cyber security appliance 100 with a cyber threat detect engine to detect a cyber threat in one or more of an email system, an Information Technology network, a cloud network, and any combination of these, ii) a proactive threat notification service 182 to publicize new and ongoing cyber threats, iii) a cyber threat autonomous response engine 140 to take one or more actions to mitigate a detected cyber threat, iv) a cyberattack simulator 105 to simulate a cyber-attack, and v) a cyber-attack restoration engine 190 to restore network components back to an operational state prior to the cyberattack.

The large language models 188 have been trained on one or more API specifications for one or more cyber security components so that the LLM 188 can understand how to make API requests and translate questions into API queries into one or more of the cybersecurity components of the cyber security system to explain the artificial intelligence's decision process in that cybersecurity component as well as explain a cyber security incident in a native human friendly format for that human. Thus, an organization can harness the capabilities of the LLMs 188 by providing them with API specifications, enabling each LLM 188 to understand how to make API requests and translate user questions into API queries within the cyber security system.

By providing and training the LLM 188 on one or more API specifications, organizations can enhance the transparency of AI-based cybersecurity platforms to enhance report generation by the LLM 188, investigations explained by the LLM 188, and training of less skilled humans. The LLM 188 can interpret user queries, translate them into API queries, and then explain how the artificial intelligence in one or more of the cyber security components arrives at its decisions. This functionality enables users to understand the reasoning behind the artificial intelligence's recommendations or actions. This functionality also helps build trust and confidence in the artificial intelligence system's capabilities, as users can gain insights into the artificial intelligence decision-making process and validate the system's outputs.

The user interfaces into the different components of the cyber security system can use the artificial intelligence to enhance how customers can interact with these products in natural language. This also allows for a natural language interaction with the cyber security product/platform. For example, given the API specifications for the cyber security appliance 100 with a cyber threat detect engine to detect a cyber threat in one or more of an email system, an Information Technology network, a cloud network, and any combination of these, please find me all devices that communicated over TCP in the last 4 days. The LLM 188 is trained on the API to one or more of the cyber security components and is trained to be aware of where certain types of information can be found, what kind of data each endpoint returns, and the data the cyber threat detect engine and/or artificial intelligence-based cyber threat analyst module 120 considers relevant for similar activity.

Each of the one or more cybersecurity components can output information which is intended to be human readable. The LLM 188 has been trained to build on top of these outputs which are intended to be human readable; and therefore, be feed the structured text output of a machine output from the cybersecurity components. The LLM 188 is capable of understanding this structured text and then perform the tasks of launching an investigation using the one or more APIs to find out additional information, and then utilizing the language capabilities of the LLM 188 to rephrase this existing textual material from the cybersecurity components in order to make the information more readily understandable to a larger audience of human end users. The large language model 188 provides assistance in explaining cybersecurity concepts to rephrase existing cybersecurity data for a range of audiences to summarize a wider range of complex incidents for quick analysis, and a produced report with potential action items. Thus, the LLMs 188 have been trained to utilize a pre-existing human readable corpus of cybersecurity data prepared with an intention of human consumption. The LLMs 188 have been configured to receive that corpus of cybersecurity data prepared for human consumption as the input to that LLM 188 in order to produce a summarization and rephrased material in the native human friendly format for a consumption by a wide range of audiences, such as end users of at least two more levels of cyber security sophistication. The large language models 188 is trained as a language tool to transform human accessible data into a first form that is human readable data into another form that is more accessible to multiple different end users. The LLMs 188 are also trained to be an investigator to find out more information and have complex terminology explained so that the end user can perform their job more optimally and then expose data in an appropriate way to non-security team end users.

Figure 3:
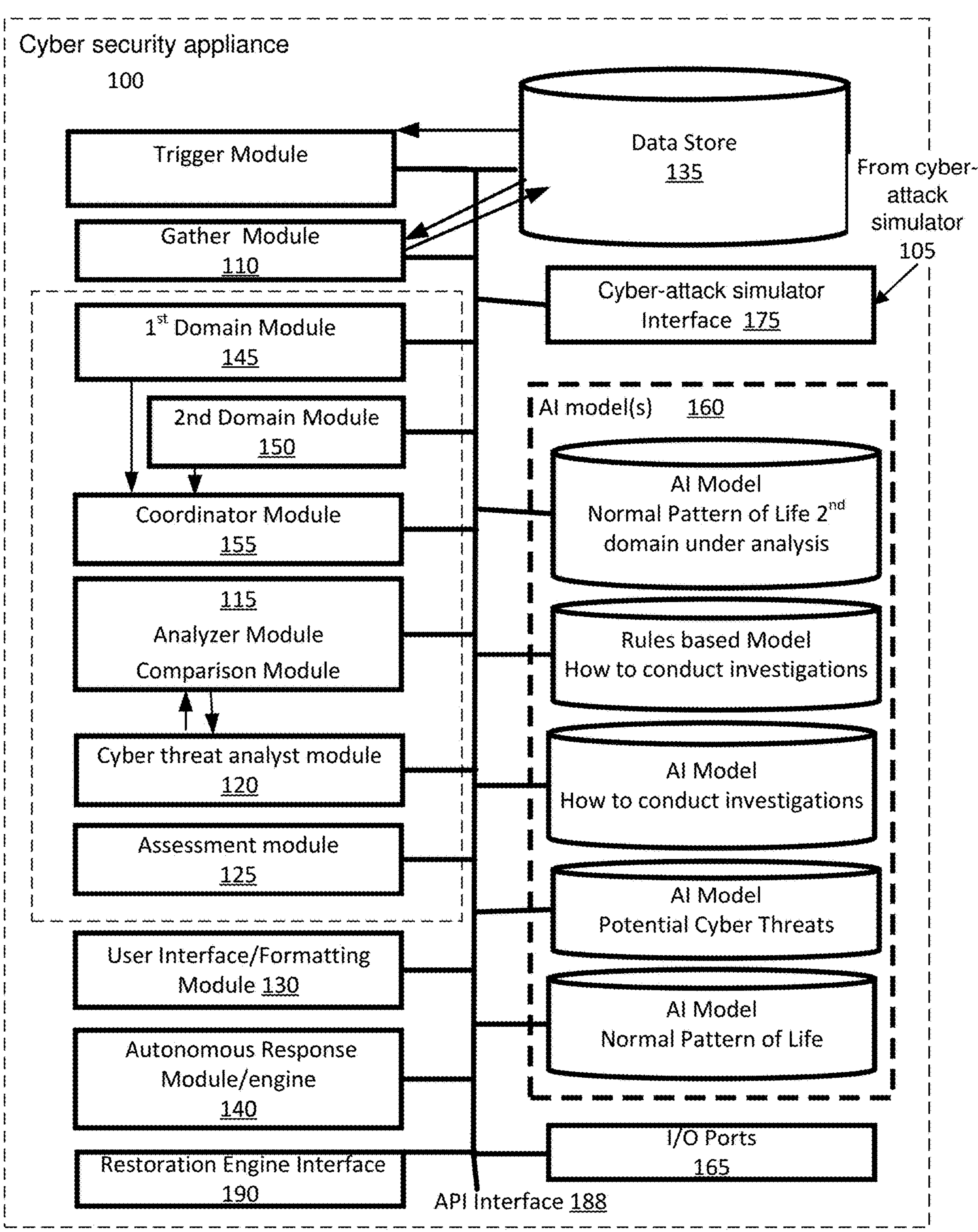
FIG. 3 illustrates a block diagram of an embodiment of the AI-based cyber security appliance with example components making up a detection engine that protects a system, including but not limited to a network/domain, cooperating with one or more language models (LLMs) via an API, from cyber threats.

FIG. 3 illustrates a block diagram of an embodiment of the AI-based cyber security appliance with example components making up a detection engine that protects a system, including but not limited to a network/domain, cooperating with one or more language models (LLMs) via an API, from cyber threats.

The cyber security appliance 100 can include i) a cyber threat detect engine configured to detect a cyber threat modules and other components to protect domains including one or more of an email system, an Information Technology network, a cloud network, and any combination of these, ii) a cyber threat autonomous response engine configured to take one or more actions to mitigate a detected cyber threat, iii) an artificial intelligence-based cyber threat analyst module 120 configured to investigate a chain of two or more minor anomalies linked to each other over a time frame of examination spanning two or more days, iv) one or more AI models including AI model(s) 160 trained with machine learning on the normal pattern of life of entities in the system, AI model(s) 160 trained on potential cyber threats, the AI model(s) 160 trained with machine learning on how to form cyber threat hypotheses and how to conduct investigations for a cyber threat hypothesis, and v) other security parts.

The LLM(s) 188 can produce a summarization and prioritization of model breaches including generated alerts. The LLM(s) 188 can produce a summarization of the full incident using Artificial Intelligence analysis of this text.

The cyber security appliance 100 with a cyber threat detect engine to detect a cyber threat in one or more of an email system, an Information Technology network, a cloud network, and any combination of these, a proactive threat notification service 182, and/or the artificial intelligence-based cyber threat analyst module 120 to investigate a chain of two or more minor anomalies can provide the one or more LLMs 188 with a list of all breaches, such as model breaches and other breaches, and their triggers and then ask the LLM 188 to provide a summary and suggested prioritization of these breaches based on the parameters known about those breaches.

One or more of the cybersecurity components can provide the list of all breaches and their severity scores as well as cyber threats trending currently in response to an API request, to the LLM, and then the LLM 188 is trained to provide the recommendations to prioritize the breaches over other breaches i) on a display and/or ii) in a printed report to the human. The LLM 188 produces both a summary of these breaches and the trends as well as to provide recommendations, of at least prioritization of the breaches, to help a user of a cyber security appliance 100 to improve their system in light of the current model breaches and cyber threat trends.

The LLM 188 has been trained to prioritize different breaches against other breaches, factoring in at least i) the supplied severity score, ii) what the current threat landscape is, and iii) the LLM's training base on understanding different types of breaches. The LLM 188 factors in those three factors, and possibly other parameters to prioritize different breaches over each other as well as a sequence of action items to take. By feeding an LLM 188 with the history of cyber security breaches and model breaches, along with severity scores and current threat trends, the LLM 188 with its training can generate summaries and recommendations for users of cyber security appliances 100. This information empowers users to proactively improve their system's security posture in light of prevailing model breaches and emerging threat trends. Furthermore, the LLMs 188 can be trained to generate software code that creates data visualizations, such as graphs and charts, showcasing cyber security breaches, user activity, and current cyber threat trends. This capability simplifies the presentation of complex data, enabling stakeholders to grasp key insights quickly. In conclusion, through the utilization of LLMs 188, organizations can enhance their cyber security measures, effectively defend against advanced threats, and strengthen their overall resilience in the face of evolving cyber threats.

When provided with a list of breaches and their triggers, an LLM 188 can generate a summary and prioritize them based on specified parameters. For example, the LLM 188 can consider the severity of the breach, the impact on critical systems or data, similarity to currently trending cyber threats, and the potential risk to the organization. By prioritizing breaches, organizations can allocate their resources more effectively, focusing on addressing the most critical incidents first. The LLM's 188 analysis assists in streamlining breach response efforts and minimizing further damage.

The LLM 188 with a list of all breaches and their triggers then asks the LLM 188 to provide a summary and prioritization of the breaches based on the parameters known about those breaches. For example, the LLM 188 with a list of example breaches, the cyber security appliance 100 with its detect engine in cooperation with the cyberattack simulator 105 to simulate a cyberattack has detected four breaches of severity score 60 for OneDrive Sync events that are new for the for users x, y, z at times a, b, c, etc., twenty breaches of severity score 30 or less for large network traffic uploads for devices j, k, l, etc. (See FIG. 5 for more examples) The LLM 188 is then trained to make API requests to provide any possible links between breaches. The LLM 188 is trained on the APIs and be aware of where information can be found, what kind of data each endpoint returns, and the data the cyber security component providing the information considers relevant for similar activity. The LLM 188 can have been trained on simplistic prioritization categories. Each individual incident has an overall score, and then individual events themselves can carry scores, and then an overall category of critical, suspicious, compliance, or informational, all assigned by the Detect engine. For example, every time a model breach, such as an unusual SSH model breach is seen, it is always assigned the same category and score. The LLM 188 may then investigate and query the proactive threat notification service 182 and/or the cyberattack simulator 105 to retrieve information about the CVE exposure and the impact score for a potentially compromised device and/or end user at the moment.

The cyber security components and the LLMs 188 assist humans in summarizing current breaches and then also suggest how to prioritize the order in which an organization should triage breaches in a native human, friendly way. Note, the LLM 188 generating a summary of the data for the purposes of prioritization with suggested prioritization is different than merely generating a summary of data on an incident for the existing technical audience. The LLMs 188 assisting humans in summarizing current breaches and then also suggest how to prioritize the order breaches allows cyber security system operators to assist in prioritization of fixing vulnerabilities in the system. This requires fewer people to operate the cyber security system.

The summary and added information produced by the LLM 188 helps to prioritize model breaches including alerts produces in the past timeframe, for example, of the last 24 hours. The LLM 188 explains terminology, breaches and their scores and relatedness, and draws upon other contextual sources, such as threat intelligence, to ensure that those summarizations for other audiences are more compelling. The LLM 188 presents all known factors to the end user. The user could also click on an icon/field/symbol etc. for a device and see what their prioritization scores as well as see color changes and/or be sent a notice communication when the score that is assigned is in the criticality range. This assists both junior and senior cybersecurity system team members in their workflow by performing the gathering and summarization of contextual data to permit prioritization of alert within the system. Again, the LLM 188 generates a report with a summary and then puts the report on the user interface display, attached to an email or other communication to an end user, and/or into a printed report.

An example LLM 188 generated report with a summary and prioritization may be as follows.

"As a priority, the ransomware is the most dangerous cyber threat at this time. Thus, please isolate the device that is involved, remove the cyber threat, and potentially restore backups onto the affected devices prior to Monday the 17th before the cyber threat compromised that device. Then, next start addressing the other vulnerabilities that allowed the cyber threat to move laterally through the network and then the vulnerabilities such as adjusting the user permissions that allowed them to have access to the employee's personal information."

Figure 4:
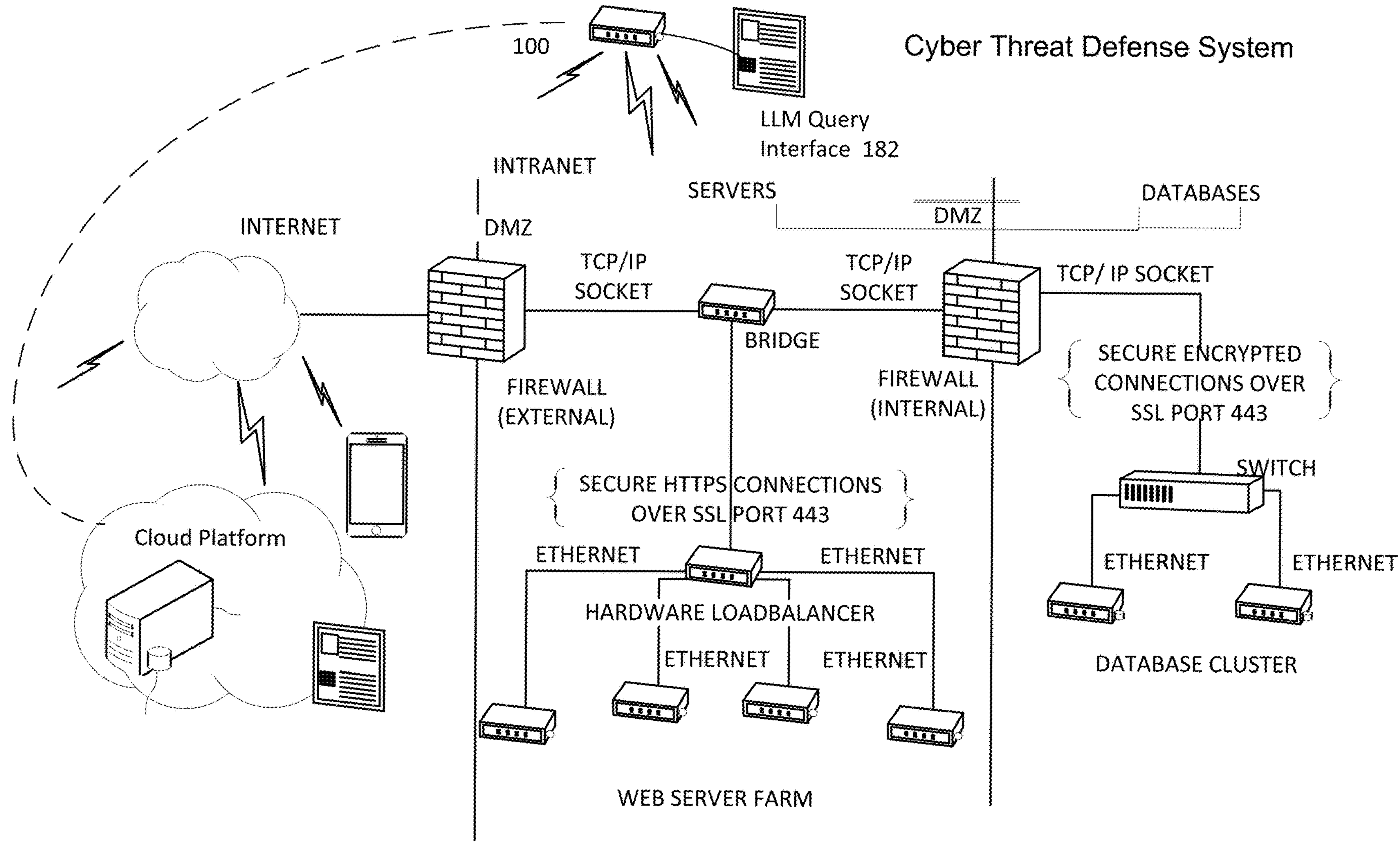
FIG. 4 illustrates a diagram of an embodiment of a LLM that has a query interface to allow a user to interact with the LLM and with the rest of the cyber security components.

FIG. 4 illustrates a diagram of an embodiment of a LLM that has a query interface to allow a user to interact with the LLM and with the rest of the cyber security components. An LLM 188 with its training on the cyber security information combined with its training to go through the APIs to obtain additional knowledge from the cyber security components creates a large cyber security knowledge base that allows the LLM 188 to act as a search engine, in response to a user's query to the query interface, to obtain and provide detailed understandings of the cyber security information. The LLM 188, with use of the user interface to select information the end user wants to know additional information about and/or request the LLM 188 to perform so action on behalf of the end user; thus, turns the LLM 188 into a search engine of sorts with a large cyber security knowledge base.

The large language model, with use of the user interface, can assist a junior cyber security team member in understanding cybersecurity terms, which can supplement the training of that junior cyber security team member. The LLM 188 has a user interface where an end user is able to select at least one of a term and a phrase as a query input to the LLM 188 in order to explain and provide additional details, and potentially examples on the selected term and/or phrase, such as 'unusual SSH connections.' For example, "the Secure Shell (SSH) protocol is a method for securely sending commands to a computer over an unsecured network. SSH connections use cryptography to authenticate and encrypt connections between devices. From threat intel, the trusted SSH keys have been reported by threat intel to have been hijacked by malicious hackers."

In another example, an end user can query the LLM 188 to "find cyber threats such as Advanced Persistent Threat groups, that are relevant to this type of unusual SSS connections and let me know of further investigations on this issue."

The user interface allows query inputs through the query interface into the trained LLM 188 to allow the LLM 188 to act as an explainer tool. A short set of examples can be as follows.

"Assistant please retrieve extra information for this file hash and explain this event."

"Assistant please retrieve more information about this user."

"Assistant please explain what this SaaS event could mean."

"Assistant please explain this MITRE technique."

"Assistant please find me the relevant Microsoft documentation for this."

In addition, the user interface into the trained LLM 188 allows the LLM 188 to act as an Informer Tool. In examples of taking actions, the user can ask the LLM 188 to export information to other platforms.

"Assistant please inform an appropriate person about this model alert."

"Assistant please create a ticket corresponding to this model alert/incident."

"Assistant please find any corresponding Intune device; then; Assistant please add appropriate cyber security information about this device onto this Intune device (and vice versa)."

"Assistant please send an email to Matt D informing him of this incident and that I'm investigating it but that he'll need to get involved."

The cybersecurity components including i) the cyber security appliance 100 with the cyber threat detect engine to detect the cyber threat in one or more of an email system, an Information Technology network, a cloud network, and any combination of these, ii) the proactive threat notification service 182 to publicize new and ongoing cyber threats, iii) the cyber threat autonomous response engine 140 to take one or more actions to mitigate a detected cyber threat, iv) the cyberattack simulator 105 to simulate a cyberattack, v) the cyber-attack restoration engine 190 to restore network components back to an operational state prior to the cyberattack, and vi) the artificial intelligence-based cyber threat analyst module 120 to investigate a chain of two or more minor anomalies linked to each other over a time frame of examination spanning two or more days, all can use the different LLMs 188 and human language identification for an automatic human language translation of content within the user interface, enabling localization. The LLM 188 has been trained to perform an automatic human language translation of the cyber security information in a first human language, such as English, into a second human language, such as Chinese, of content within a user interface to be displayed on a display screen, enabling localization. This feature is particularly useful for user comments, email content, or other non-hard-coded text. For example, an LLM 188 can be used to translate emails, button texts, team messages, event types, or analyst comments into various languages, enhancing accessibility and facilitating effective communication across language barriers. Thus, for example:

1) Translate this email so that my Spanish team can work on it;
2) Translate all the button texts to French;
3) Translate this Teams message to Spanish;
4) Translate all the SaaS event types; and
5) Translate this analyst's comment into my language.

By leveraging these additional capabilities of LLMs 188, organizations can enhance their cyber security measures, improve user training, simulate realistic attack scenarios, integrate with third-party services, facilitate user data analysis, and enable multilingual functionality within their platforms.

The LLM 188 performing automatic translation of a first human language, such as English, into a second human language is specifically trained in both the first and the second human language as well as then has had fine-tuned training for cyber security specific terminology and formats.

Artificial Intelligence Training

Detailed discussion on the machine learning and training has occurred in different portions of this document and won't be replicated here. Again, the one or more LLMs 188 are trained to do tasks on behalf of a user and provide human readable summaries, including i) summarization and prioritization of breaches, ii) launching an investigation using the one or more APIs to find out all of this information, and then iii) utilizing the language capabilities of the LLM 188 to rephrase existing textual material to make the information more readily understandable to a larger audience of human end users.

In general, a LLM 188 can be a very large deep learning model that is pre-trained on vast amounts of data. The underlying transformer can be a set of neural networks that consist of an encoder and a decoder with self-attention capabilities. The encoder and decoder extract meanings from a sequence of text and understand the relationships between words and phrases in it. A transformer in the LLM 188 can be capable of unsupervised training, although a more precise explanation is that the transformer performs self-learning. It can be through this process that the transformer learns to understand basic grammar, languages, and knowledge.

The large language models 188 can be trained to understand and generate human-like language and the associated generative AI-creating algorithms that can generate new content based on patterns learned from existing data are used to enhance cyber security measures across various aspects of the field. The large language models 188 can be AI algorithms that have been trained on a large amount of text-based data, typically scraped from i) the open internet such as webpages and sources such as scientific research, books, forums or social media posts, ii) security data from a fleetwide deployment of cyber security appliances 100, as well as iii) combinations of both. The generative portion of the LLM 188 can generate new content (e.g., software code, text, requests, etc.). The cyber security system uses large language models 188 (and the associated generative AI-creating algorithms that can generate new content based on patterns learned from existing data.

The LLM model can be trained from scratch and/or merely be fine-tuned/refined. The fine-tuning of the training can start with a generic LLM model that has already been trained and specialized in some of these elements and then have certain layers and parameters unlocked. Fine tuning trains alters the unlocked layers and parameters from their existing training to perform the functions described herein. For example, one can acquire a single LLM model that is capable of rephrasing and then train that LLM 188 on the functionality discussed herein, or one could have multiple individual LLM models that are fine-tuned on each of the tasks discussed herein. In addition, the multiple individual LLM models can be fine-tuned on specific aspects of a task such as learning an API of merely one cyber security component, etc.

The LLM 188 training process can include the following. The use of unlabeled data can be used to train. However, the information is either in standard API schema or somewhat standardized cyber security information format so the data can be somewhat considered already semi labeled data. Most training algorithms utilized to train can work. Tens of thousands of cycles of the training occurred for each task that the LLM 188 is being requested to learn. Training data across a fleet of cyber security deployments can be used as well as generic training data scaped from the Internet can be used so that the machine learning does not become too specialized. A training process utilized was a problem to be solved/learned and key efficiencies and/or goals were used as measures during the machine learning process. Again, a generically trained LLM 188 could be the starting point and then certain layers and parameters are unlocked for fine tune training to particularly adapt the AI leaning as discussed herein.

The LLM 188 has been trained on tens of thousands of cyber security incident reports and automated communication templates to generate tailored communication templates for each customer and the audiences they specify to streamline information sharing and incident updates.

Additional Details

The following text below discusses how some of the other components in the cyber security system operate; and thus, how these components respond to the commands, requests, and communications from the LLMs 188.

FIG. 3 shows the AI-based cyber security appliance with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. As shown, according to one embodiment of the disclosure, the AI-based cyber security appliance 100 may include a trigger module, a gather module 110, an analyzer module 115, a cyber threat analyst module 120, an assessment module 125, a user interface and formatting module 130, a data store 135, an autonomous response engine 140 and/or an interface to an autonomous response engine 140, an Information Technology network domain module 145, an email domain module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, an interface to a restoration engine 190, an interface to a cyber-attack simulator 105, an API interface to the LLMs 188, and other similar components.

The cyber security appliance 100 can host the cyber threat detection engine and other components. The cyber security appliance 100 includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models in the cyber security appliance 100 to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, the IT network domain module (e.g., first domain module 145) may communicate with network sensors to monitor network traffic going to and from the computing devices on the network as well as receive secure communications from software agents embedded in host computing devices/containers. Other domain modules such as the email domain module 150 and a cloud domain module operate similarly with their domain. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories.

The analyzer module 115 can cooperate with the AI model(s) 160 or other modules in the cyber security appliance 100 to confirm a presence of a cyberattack against one or more domains in an enterprise's system (e.g., see system/enterprise network 791, 792, and 747 of FIG. 2). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response engine 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Figure 5:
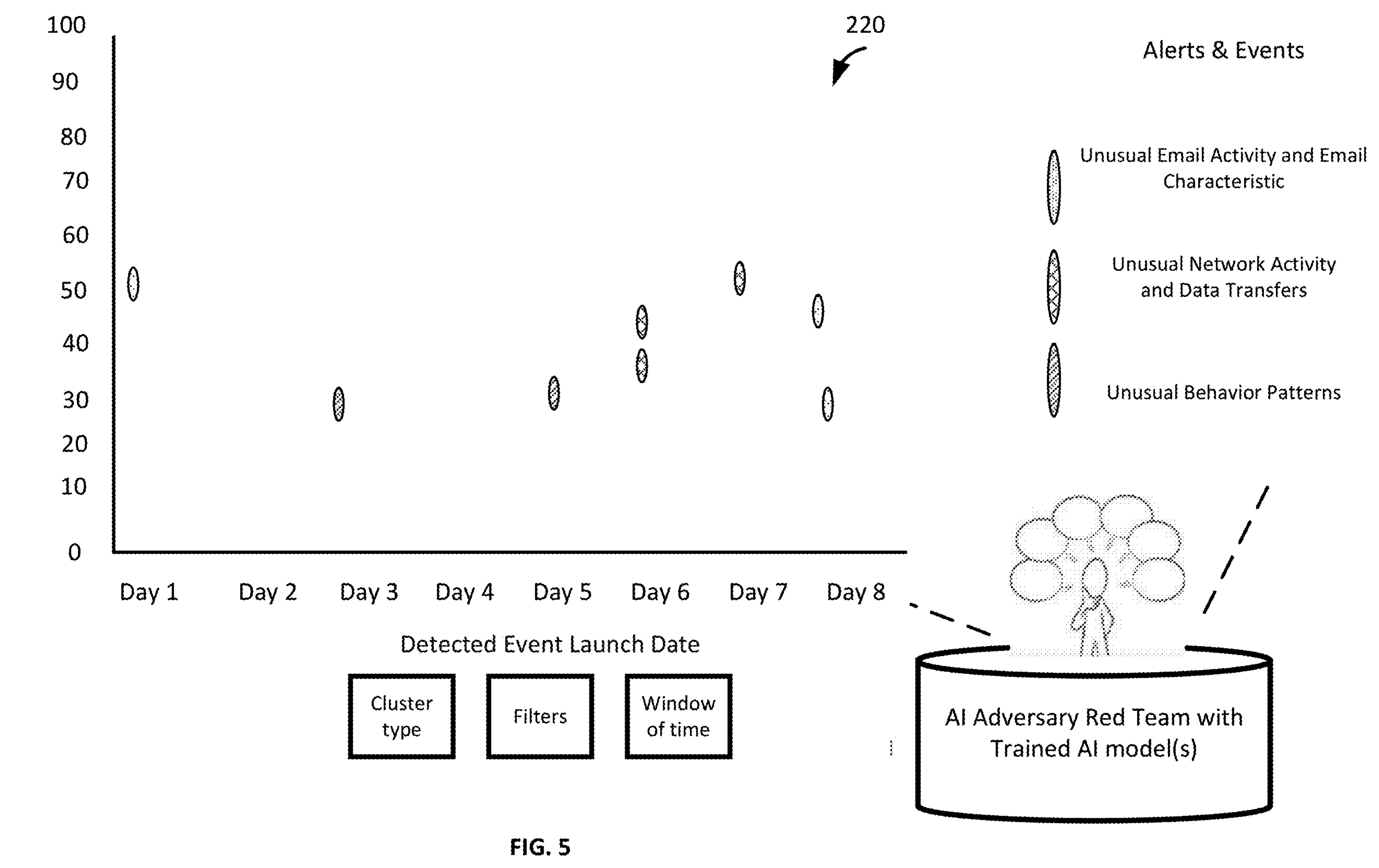
FIG. 5 illustrates a graph 220 of an embodiment of an example chain of unusual behaviour for, in this example, the email activities and IT network activities deviating from a normal pattern of life in connection with the rest of the system/network under analysis.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 5, the cyber threat analyst module 120 may perform several additional rounds 220 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Furthermore, the artificial intelligence-based cyber threat analyst module 120 aids security analysts in making informed decisions for cyber threat hunting. The artificial intelligence-based cyber threat analyst module 120 equips human security analysts with the necessary information to proactively identify and mitigate potential security incidents. By analyzing data from various sources, such as network logs, intrusion detection systems, and threat intelligence feeds, the tool can highlight indicators of compromise (IOCs) and provide recommendations for remediation actions. This empowers security analysts to respond swiftly to critical incidents and minimize the impact on the organization.

To streamline security operations, the artificial intelligence-based cyber threat analyst module 120 automates repetitive and mundane tasks, enabling analysts to focus on more critical and complex activities. The artificial intelligence-based cyber security analyst can handle data collection and extraction from multiple sources, reducing the manual effort required to gather relevant information for analysis. Additionally, the tool performs basic threat searches and detection, leveraging its understanding of threat intelligence and historical attack patterns to identify potential security threats.

The artificial intelligence-based cyber threat analyst module 120 as a large language model (LLM) is built to incorporate cyber threat knowledge from external data stores, external data sources, as well as from a network's own cyber security appliance. The artificial intelligence-based cyber threat analyst module 120 uses threat intelligence to understand a cyber threat adversary tactics and motivations. The effectiveness of the artificial intelligence-based cyber threat analyst module 120 lies in its ability to access and integrate diverse data sources. The artificial intelligence-based cyber security analyst can tap into external data stores, such as threat intelligence platforms and vulnerability databases, to enrich its understanding of the threat landscape. Additionally, the tool leverages data from an organization's internal cybersecurity appliance, an intrusion prevention simulator system, and endpoint protection solutions, to gain insights into the specific threats and vulnerabilities faced by the organization. This combination of external and internal data sources allows the artificial intelligence-based cyber threat analyst module 120 to provide a holistic view of the organization's security posture.

Through continuous improvement and refinement, the artificial intelligence-based cyber threat analyst module 120 ensures that it remains up-to-date with the evolving cybersecurity landscape. It collaborates closely with industryleading cyber threat hunters, managed detection and response operators, and incident response experts to incorporate their expertise and insights into its analysis. This feedback loop helps enhance the tool's accuracy and effectiveness, enabling it to adapt to emerging threats and new attack vectors.

In addition to its technical capabilities, the artificial intelligence-based cyber threat analyst module 120 facilitates human-machine collaboration to tackle the challenges posed by adversaries. By leveraging the speed and computational power of AI, combined with human expertise and intuition, security teams can gain a significant advantage. The tool serves as a force multiplier, augmenting the capabilities of security analysts and enabling them to detect and respond to threats more efficiently.

The artificial intelligence-based cyber threat analyst module 120 understands the importance of adaptability and agility in the face of evolving threats. The artificial intelligence-based cyber threat analyst module 120 employs advanced analytics to prioritize critical vulnerabilities and potential risks, enabling organizations to allocate their resources effectively. By generating and validating new indicators of attack (IOAs), the tool aids in the identification of emerging attack patterns, empowering security teams to proactively defend against evolving threats.

Ultimately, the artificial intelligence-based cyber threat analyst module 120 recognizes that effective cybersecurity requires a combination of AI-driven analysis and human intelligence. The artificial intelligence-based cyber threat analyst module 120 can incorporate human insight into the investigative loop. The artificial intelligence-based cyber threat analyst module 120 tracks the adversaries that are constantly innovating and adapting their tactics, and incorporates human expertise and insights into the training data used by the models in the artificial intelligence-based cyber threat analyst module 120. By blending the strengths of AI and human intelligence, organizations can stay ahead of the threat landscape and proactively defend against emerging cyber threats. The adversary is constantly breaking rules and changing tactics, making it hard for AI to respond without the right data to train the model. This is why human-validated content is critical for AI to perform security use cases and give security teams the advantage over adversaries.

Returning back to FIG. 3, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 5 and a chain of linked low-level indicators, including abnormal behavior compared to the normal patten of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response engine 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyberattack from that other Artificial Intelligence-based engine's perspective. The autonomous response engine 140 works with the assessment module in the detection engine when the cyber threat is detected and autonomously takes one or more actions to mitigate the cyber threat. FIG. 3 shows the example components making up the detection engine to include interfaces to the cyber-attack simulator, the autonomous response engine 140, and the restoration engine.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Referring to FIG. 1, the cyber security restoration engine 190 is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin. The cyber security restoration engine 190 is configured to cooperate with the other AI-based engines of the cyber security system, via the interfaces and/or direct integrations, to track and understand the cyber threat identified by the other components as well as track the one or more mitigation actions taken to mitigate the cyber threat during the cyberattack by the other components in order to assist in intelligently restoring the protected system while still mitigating the cyber threat attack back to a trusted operational state; and thus, as a situation develops with an ongoing cyberattack, the cyber security restoration engine 190 is configured to take one or more remediation actions to remediate (e.g. restore) at least one of the nodes in the graph of the protected system back to a trusted operational state while the cyberattack is still ongoing.

The example multiple Artificial Intelligence-based engines cooperating with each other can include i) the cyber threat detection engine, ii) an autonomous response engine 140, iii) a cyber-security restoration engine 190, and iv) a cyber-attack simulator. i) The cyber threat detection engine (consisting of the modules making up the cyber security appliance 100) can be configured to use Artificial Intelligence algorithms trained to perform a machine-learned task of detecting the cyber threat. (See for example FIG. 3) ii) The autonomous response engine 140 can be configured to use Artificial Intelligence algorithms trained to perform a machine-learned task of taking one or more mitigation actions to mitigate the cyber threat. iii) The cyber-security restoration engine 190 can be configured to use Artificial Intelligence algorithms trained to perform a machine-learned task of remediating the system being protected back to a trusted operational state. iv) The cyber-attack simulator can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 2)

The multiple Artificial Intelligence-based engines have communication hooks in between them to exchange a significant amount of behavioral metrics including data between the multiple Artificial Intelligence-based engines to work in together to provide an overall cyber threat response.

The intelligent orchestration component can be configured as a discreet intelligent orchestration component that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration component can be configured as a distributed collaboration with a portion of the intelligent orchestration component implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration component can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team.

FIG. 1 illustrates a diagram of an embodiment of i) the cyber threat detection engine using Artificial Intelligence algorithms trained to perform a first machine-learned task of detecting the cyber threat, ii) an autonomous response engine 140 using Artificial Intelligence algorithms trained to perform a second machine-learned task of taking one or more mitigation actions to mitigate the cyber threat, iii) a cyber-security restoration engine 190 using Artificial Intelligence algorithms trained to perform a third machine-learned task of remediating the system being protected back to a trusted operational state, and iv) a cyber-attack simulator using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

The cyber-security restoration engine 190 receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine 140 uses its intelligence to cooperate with a cyber-attack simulator and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine 140, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine 140 monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine 140 trained on how to isolate a compromised node as well as to take mitigation acts with other nodes that have a direct *nexus* to the compromised node.

In another example, the cyber-attack simulator and its Artificial Intelligence-based simulations use intelligence to cooperate with the cyber-security restoration engine 190 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine 190 restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine 140.

FIG. 2 shows an embodiment of the cyber-attack simulator with Artificial Intelligence-based simulations conducted in the cyber-attack simulator by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 2, the various cooperating modules residing in the cyber-attack simulator 105 may include, but are not limited to, a collections module 705, a cyberattack generator (e.g. phishing email generator with a paraphrasing engine) 702, an email module 715, a network module 720, an analyzer module 725, a payloads module 730 with first and second payloads, a communication module 735, a training module 740, a simulated attack module 750, a cleanup module 755, a scenario module 760, a user interface 765, a reporting module, a formatting module, an orchestration module, an AI classifier with a list of specified classifiers.

The cyber-attack simulator 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100. The cyber-attack simulator 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The cyber-attack simulator 105 may use the trained AI models to cooperate with one or more AI classifier(s) by producing a list of specific organization-based classifiers for the AI classifier. The cyber-attack simulator 105 is further configured to calculate, based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

FIG. 6 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The cyber-attack simulator 105 plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI models 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat-malicious or accidental, Zero-day attacks-previously unseen, novel exploits, latent vulnerabilities, machine-speed attacks-ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 3 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not. Anomaly detection can discover unusual data points in your dataset. Anomaly can be sometimes a synonym for the word 'outlier'.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

Additional Module Interactions

Referring back to FIG. 3, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the IT network domain module 145 may receive information from and send information to, in this example, IT network-based sensors (i.e., probes, taps, etc.). The IT network domain module 145 also has algorithms and components configured to understand, in this example, IT network parameters, IT network protocols, IT network activity, and other IT network characteristics of the network under analysis. The second domain module 150 is, in this example, an email module. The email domain module 150 can receive information from and send information to, in this example, email-based sensors (i.e., probes, taps, etc.). The email domain module 150 also has algorithms and components configured to understand, in this example, email parameters, email protocols and formats, email activity, and other email characteristics of the network under analysis. Additional domain modules, such as a cloud domain module can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI models 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI models 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

In another AI classifier is trained to find potentially malicious indicators. The agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioural pattern analysis of what are the unusual behaviours of the network/system/device/user under analysis by the machine learning models may be as follows. The coordinator module can tie the alerts, activities, and events from, in this example, the email domain to the alerts, activities, and events from the IT network domain. FIG. 5 illustrates a graph 220 of an embodiment of an example chain of unusual behaviour for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor-human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviours under analysis, that are equal to or above a configurable level of threat posed by this malicious actor.

The autonomous response engine 140 of the cyber security system is configured to take one or more autonomous mitigation actions to mitigate the cyber threat during the cyberattack by the cyber threat. The autonomous response engine 140 is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine 190 can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine 140

In the next step, the analyzer module and/or cyber threat analyst module generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module cooperates with the following three sources. The analyzer module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processers. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine 140 to take an autonomous action such as i) deny access in or out of the device or the network and/or ii) shutdown activities involving a detected malicious agent.

The autonomous response engine 140, rather than a human taking an action, can be configured to cause one or more rapid autonomous mitigation actions to be taken to counter the cyber threat. A user interface for the response module can program the autonomous response engine 140 i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine 140 will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine 140 uses one or more Artificial Intelligence models that are configured to intelligently work with other third-party defense systems in that customer's network against threats. The autonomous response engine 140 can send its own protocol commands to devices and/or take actions on its own. In addition, the autonomous response engine 140 uses the one or more Artificial Intelligence models to orchestrate with other third-party defense systems to create a unified defense response against a detected threat within or external to that customer's network. The autonomous response engine 140 can be an autonomous self-learning response coordinator that is trained specifically to control and reconfigure the actions of traditional legacy computer defenses (e.g., firewalls, switches, proxy servers, etc.) to contain threats propagated by, or enabled by, networks and the internet. The cyber threat module can cooperate with the autonomous response engine 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Again, the multiple (e.g., four) Artificial Intelligence-based engines have communication hooks in between them to exchange a significant amount of behavioral metrics including data between the multiple Artificial Intelligence-based engines to work in together to provide an overall cyber threat response. The AI adaptive incident response loop has interaction and orchestration between the multiple (four) self-learning AI components, each trained and focused on their individual machine-learned tasks of i) detecting a cyber threat, ii) how to conduct a simulation and make the prediction about a cyberattack, iii) how to make and what types of autonomous mitigation responses can be made in response to a cyberattack and iv) what level of restrictions are needed and how to invoke restoration actions to restore nodes in the system being protected while still mitigating effects of the cyberattack. The Artificial Intelligence in each of the engines trained and focused on performing their corresponding machine-learned tasks as well as the orchestration between the Artificial Intelligence-based engines drive the exchange to make them work in together against a cyberattack by the cyber threat (e.g., malicious actor). The intelligent orchestration component facilitates the multiple example stages of the Artificial Intelligence augmented and adaptive interactive response loop between these four Artificial Intelligence-based engines.

FIG. 1 illustrates a diagram of an example interactive Artificial Intelligence-based response loop between the multiple Artificial Intelligence-based engines working in tandem to provide an overall cyber threat response and their cooperation with the LLMs. The cyber-attack simulator after running the Artificial Intelligence-based simulations communicates to the autonomous response engine 140 the locations where it could block the likely and/dangerous next moves by the attacker. The Artificial Intelligence in the autonomous response engine 140 analyzes the simulation results and grabs any additional information needed to decide what nodes need autonomous actions and what mitigation actions to take to each node that is compromised and potentially its neighboring nodes. The Artificial Intelligence in the autonomous response engine 140 reasons and takes action. The AI engines also update the report visible to the human cyber security team.

This interactive Artificial Intelligence-based response loop between the multiple Artificial Intelligence-based engines working together continues on. The intelligent orchestration component uses unsupervised machine learning algorithms to self-learn from previous cyber threat incidents (and their aftermath) on tasks such as how the response went, what worked, what did not, how long things took and how this compared to previous occasions and to expectations, and then uses this information to adjust future incident response expectations and priorities. The intelligent orchestration component can use action success/completion and time taken as measures of improvement. Likewise, the restoration engine can use unsupervised machine learning algorithms to self-learn from previous cyber threat incidents to get better at healing the system being protected to mitigate the cyber threat while minimizing an impact on the system being protected. Likewise, the cyber security restoration engine 190 can use one or more unsupervised machine learning algorithms, as a self-learning entity, to have an ability to learn how to restore the one or more nodes in the graph of the protected system back to the trusted operational state while still mitigating against the cyber threat so the cyber security restoration engine 190 gets better over time of a deployment of the cyber security restoration engine 190 by learning from previous restoration attempts (e.g. action success/completion and time taken as measures, action effectiveness as a measure, etc., as well as including or adapting changes to previous recommendations made by the human security team.

The cyber threat detection engine, the autonomous response engine 140, the cyber-attack simulator all perform their machine-learned task and send inputs to each other to assist in determining what nodes are impacted, what cyber threat is causing the problems, and how the cyberattack likely occurred and will progress based upon possible mitigation and restoration actions taken so that the restoration engine can rely on the determinations by the Artificial Intelligence in those AI-based engines to give the restoration engine a fantastic starting point for figuring out what is the system being protected is trying to recover from and then a best way to restore the nodes in the system.

There are four discrete AI-based engines working to achieve aims with their own machine learning approaches. Each separate AI contributes data that has been processed intelligently through machine learning approaches and then hands over the processed behavioral metrics to another AI engine which then performs its own individualized machine-learned task.

The cyber-attack simulator 105 in conducting simulations can use the cyber threat analyst module with external data input (e.g., crowdstrike) and cooperate with the detection engine to identify an infected patient zero and additional devices actually compromised and/or directly linked to devices actually compromised in need of remediation. The linked devices or the activity may not be directly visible to the detection engine alone and the external data input fills in the big picture. The cyber security restoration engine 190 to restore the protected system can potentially use the external data input that the system is receiving from third party integrations (e.g., from host-based agents from 3rd party vendors, antivirus and-based testing antivirus, etc. to identify patient zero of the attack, identify, where the attack has happened and is happening, identify devices that the system reasonably believes are linked to the compromised entity, and recommend remediation or perform remediation via AI alone, and/or AI in combination with human assistance. The cyber security restoration engine 190 can restore the protected system back to a state before a compromise (e.g., abnormalities started) by a cyber threat occurred to the protected system. The cyber security restoration engine 190 restores nodes in the protected system to cyberattacks in progress-so heals in real time, as an attack happens, as well as can assist in healing after an attack has taken place.

The trusted operational state of a node can be an operational state for a date and time before the earliest detection of a possible compromise of a node in the graph (device and/or user account) plus a threshold buffer amount of time.

In an example, the detection engine can use historic IaaS data on virtual resource usage to identify errant virtual resources and the autonomous response engine 140 to spin down those resources or disable overactive microservices like lambdas. In another example, the detection engine can use historic IaaS data on virtual resource usage to understand when a client is undergoing some kind of DDOS and the autonomous response engine 140 acts to do scaling to handle the load until the overload is over. The restoration engine can recommend controlling the scaling when the system understands deliberate overloading of traffic is occurring and then bringing that scaling back down again to assist their service architectures to deal with situations when some cyber threat is trying to overload those systems to bring that customer down.

In another example, the cyber security restoration engine 190 to restore the protected system can use historic source codebase information and modelling from the AI models in the detection engine for development to revert commits and code changes that potentially introduce bad or compromised code. The cyber security restoration engine 190 to restore the protected system can also use historic records of a source code database information to find out when during the development of a product that the cyber-attack occurred on the source code in order to restore the source code back to the state before the compromise occurred, as well as use historic code base analysis and understanding to identify supply chain and products vulnerable to bad code/compromised code and sending an update package/at least a notice to revert those products and further prevent the source code vulnerabilities from trickling down the supply chains from the vendor to the end user. Once file data of a cyber threat is identified, then that file data and its characteristics are captured in an inoculation package and then cascade that file information to each cyber security appliance in the fleet of cyber security appliances, and quarantine the identical and very similar files in order to remove them from all of the environments before anything can spread even more than it has via immediate remediation and also using the system's own inoculation data.

In an example, the autonomous response engine 140 can stop a device that is infected from connecting to other nodes. In addition, the autonomous response engine 140 can restrict reading and writing traffic and/or types of data/information being communicated in that traffic to restrict traffic movement and process activity to nodes close to an entity that the system thinks is performing erroneously or infected.

Referring to FIG. 3, the autonomous response engine 140 is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine 140 can have a discovery module to i) discover capabilities of each node being protected device and the other cyber security devices (e.g., firewalls) in the system being protected and ii) discover mitigation actions they can take to counter and/or contain the detected threat to the system being protected, as well as iii) discover the communications needed to initiate those mitigation actions.

For example, the autonomous response engine 140 cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine 140 will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine 140 for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine 140 has a default set of autonomous mitigation actions shown on its user interface that it knows how to perform when the different types of cyber threats are equal to or above a user configurable threshold posed by this type of cyber threat. The autonomous response engine 140 is also configurable in its user interface to allow the user to augment and change what type of automatic mitigation actions, if any, the autonomous response engine 140 may take when different types of cyber threats that are equal to or above the configurable level of threat posed by a cyber threat.

The autonomous response engine 140 can also reference its artificial intelligence trained to perform mitigation actions. Again, the autonomous response engine 140 has an administrative tool in its user interface to program/set what autonomous mitigation actions the autonomous response engine 140 can take, including types of mitigation actions and specific mitigation actions the autonomous response engine 140 is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine 140 can also reference a default library of mitigation actions, types of mitigation actions and specific mitigation actions the autonomous response engine 140 is capable of on a particular node.

Referring to FIG. 2, the cyber-attack simulator 105 using Artificial Intelligence-based simulations is communicatively coupled to a cyber security appliance 100, an open source (OS) database server 790, an email system 796, one or more endpoint computing devices 791A-B, and an IT network system 792 with one or more entities, over one or more networks 791/792 in the system being protected.

The cyber-attack simulator 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The cyber-attack simulator 105 may include a cyber threat generator module to generate many different types of cyber threats with the past historical attack patterns to attack the simulated system to be generated by the simulated attack module 750 that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and IT network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the cyber-attack simulator 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g., network) or the particular node is downstream of a node exposed to direct contact by the entity generating the cyber threat external to the network.

The node exposure score generator and the simulated attack module 750 in the cyber-attack simulator 105 cooperate to run the one or more hypothetical simulations of an actual detected cyber threat incident and/or a hypothetical cyberattack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module 750, via a simulator and/or a virtual network clone creator, can be programmed to model and work out the key paths and devices in the system (e.g., a network, with its nets and subnets,) via initially mapping out the system being protected and querying the cyber security appliance on specific's known about the system being protected by the cyber security appliance 100. The simulated attack module 750 is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the cyber-attack simulator 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the cyber-attack simulator 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module 750 will make a model incorporating the actual data of the system through the simulated versions of the nodes making up that system for running simulations on the simulator. Again, a similar approach is taken when the simulated attack module 750 uses a clone creator to spin up and create a virtual clone of the system being protected with virtual machines in the cloud.

The cyber-attack simulator 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The cyber-attack simulator 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the IT network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The cyber-attack simulator 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module 750 factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module 750 is configured to run the one or more hypothetical simulations of the detected cyber threat incident and feed details of a detected incident by a cyber threat module in the detection engine into the collections module of the cyber-attack simulator 105 using Artificial Intelligence-based simulations. The simulated attack module 750 is configured to run one or more hypothetical simulations of that detected incident in order to predict and assist in the triggering an autonomous response by the autonomous response engine 140 and then restoration by the restoration engine to the detected incident.

The simulated attack module 750 ingests the information for the purposes of modeling and simulating a potential cyberattacks against the network and routes that an attacker would take through the network. The simulated attack module 750 can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g., node) being simulated in the system because the cyber-attack scenario is based upon security credentials and behavior characteristics from actual traffic data fed to the modules, data store, and AI models of the cyber security appliance.

The cyber-attack simulator 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The cyber-attack simulator 105 with Artificial Intelligence-based simulations in the cyber-attack simulator 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine 140, and the cyber-security restoration engine 190, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The cyber-attack simulator cooperates with the AI models modelling a normal pattern of life for entities/nodes in the system being protected.

The simulated attack module 750 is programmed itself and can cooperate with the artificial intelligence in the restoration engine to factor an intelligent prioritization of remediation actions and which nodes (e.g., devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the cyberattack simulator 105, when doing attack path modelling, does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 4 shows the AI-based cyber security appliance 100 with the LLMs 188 and other Artificial Intelligence-based engines plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Referring back to FIG. 3, a computer system within a building, can use the cyber security appliance 100 to detect and thereby attempt to prevent threats to computing devices within its bounds. In this exemplary embodiment of the cyber security appliance 100 with the multiple Artificial Intelligence-based engines is implemented on a computer. The computer has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in the computer builds and maintains a dynamic, ever-changing model of the 'normal behavior' of each user and machine within the system. The approach is based on Bayesian mathematics, and monitors all interactions, events, and communications within the system-which computer is talking to which, files that have been created, networks that are being accessed.

For example, a second computer is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance's 100 unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The models in the cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory storage devices in an executable format to be executed by one or more processors. The computer readable storage medium may be non-transitory and does not include radio or other carrier waves. The computer readable storage medium could be, for example, a physical computer readable storage medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 7 illustrates a block diagram of an embodiment of one or more computing devices that can be a part of the Artificial Intelligence-based cyber security system including the multiple Artificial Intelligence-based engines and LLMs discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cybersecurity system, comprising:

one or more cybersecurity components including i) a cyber security appliance with a cyber threat detect engine to detect a cyber threat in one or more of an email system, an Information Technology network, a cloud network, and any combination thereof, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more anomalies linked to each other over a time frame of examination spanning two or more days;

one or more large language models (LLMs) implemented with 1) electronic circuit, 2) as software stored in one or more non-transitory computer storage mediums and executed by one or more processors, or 3) any combination thereof, and configured to communicate and cooperate with the one or more cybersecurity components via one or more Application Program Interfaces (APIs) to receive cyber security information being produced by the one or more of the cybersecurity components and then to apply language generation functionality in order to assist a human in an understanding of the cyber security information being produced by the cybersecurity components, and then also to provide recommendations to prioritize breaches over other breaches in a native human friendly format for the human;

where instructions implemented in software for the cybersecurity components and the large language models are configured to be stored in one or more non-transitory storage mediums to be executed by one or more processing units, and where the one or more LLMs are trained to do tasks on behalf of a user and provide human readable summaries, including i) summarization and prioritization of breaches, ii) launching an investigation using the one or more APIs to find out information, and then iii) utilizing language capabilities of the LLMs to rephrase existing textual material to make the information more readily understandable to a larger audience of human end users.

2. The cybersecurity system of claim 1, comprising:

where a first LLM has been trained on an API specification for one or more of the cyber security components so that the first LLM of the one or more LLMs can understand how to make API requests and translate at least one of i) a user question and ii) a question by the LLM itself into API queries into the one or more cyber security components of the cyber security system to explain a decision process of a machine learning from within that cyber security component as well as explain a cyber security incident in the native human friendly format for that human.

3. The cybersecurity system of claim 1, comprising:

where a first LLM has been trained on an API specification for one or more of the cyber security components so that the first LLM of the one or more LLMs can understand how to make API requests to help explain both i) a decision-making process of one or more of the cyber security components as well as ii) cyber security jargon and concepts to enhance transparency and trust.

4. The cybersecurity system of claim 1, comprising:

where a first LLM has been trained on an API specification for one or more of the cyber security components so that the first LLM of the one or more LLMs can understand how to make API requests, where the training also included training on capabilities of each of the one or more of the cybersecurity components including what type of information can be found by communicating with each particular cybersecurity component as well as how to get that information through an API request.

5. The cybersecurity system of claim 1, comprising:

where a first LLM has been trained to take in a specification description of one or more of the APIs and turn the specification of one or more of the APIs into a set of endpoints and their associated parameters and available information that a trained deep learning model in the LLM will then use to call the cybersecurity components.

6. The cybersecurity system of claim 1, comprising:

where a first LLM has been trained to perform an automatic translation of the cyber security information in a first human language into a second human language of content within a user interface to be displayed on a display screen.

7. The cybersecurity system of claim 1, comprising:

where a first LLM has a query interface, where the first LLM of the one or more LLMs with its training on the cyber security information combined with its training to go through the APIs to obtain additional knowledge from the cyber security components creates a large cyber security knowledge base that allows the first LLM of the one or more LLMs to act as a search engine, in response to a user's query to the query interface, to obtain and provide detailed understandings of the cyber security information.

8. The cybersecurity system of claim 1, comprising:

where a first LLM has a user interface, where an end user is able to select at least one of a term and a phrase, displayed on the user interface, as a query input to the first LLM of the one or more LLMs in order to cause the first LLM of the one or more LLMs to explain and provide additional details on the selected term and/or phrase.

9. The cybersecurity system of claim 1, comprising:

where one or more of the cybersecurity components, which are configured to provide a list of all of the breaches and their severity scores as well as cyber threats trending currently in response to a first API request, to a first LLM of the one or more LLMs, and then the first LLM of the one or more LLMs is trained to provide the recommendations to prioritize the breaches over other breaches i) on a display and/or ii) in a printed report to the human.

10. A method to protect against cyber threats, comprising:

providing one or more cybersecurity components including i) a cyber security appliance with a cyber threat detect engine to detect a cyber threat in one or more of an email system, an Information Technology network, a cloud network, and any combination thereof, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more anomalies linked to each other over a time frame of examination spanning two or more days;

providing one or more large language models (LLMs) to communicate and cooperate with the one or more cybersecurity components via one or more Application Program Interfaces (APIs) to receive cyber security information being produced by the one or more of the cybersecurity components and then to apply language generation functionality in order to assist a human in an understanding of the cyber security information being produced by the cybersecurity components, and then also to provide recommendations to prioritize breaches over other breaches in a native human friendly format for the human; and providing the one or more LLMs that are trained to do tasks on behalf of a user and provide human readable summaries, including i) summarization and prioritization of breaches, ii) launching an investigation using the one or more APIs to find out information, and then iii) utilizing language capabilities of the LLMs to rephrase existing textual material to make the information more readily understandable to a larger audience of human end users.

11. The method of claim 10, comprising:

providing a first LLM that has been trained on an API specification for one or more of the cyber security components so that the first LLM of the one or more LLMs can understand how to make API requests and translate at least one of i) a user question and ii) a question by the LLM itself into API queries into the one or more cyber security components of the cyber security system to explain a decision process of a machine learning from within that cyber security component as well as explain a cyber security incident in the native human friendly format for that human.

12. The method of claim 10, comprising:

providing a first LLM that has been trained on an API specification for one or more of the cyber security components so that the first LLM of the one or more LLMs can understand how to make API requests to help explain both i) a decision-making process of one or more of the cyber security components as well as ii) cyber security jargon and concepts to enhance transparency and trust.

13. The method of claim 10, comprising:

providing a first LLM that has been trained on an API specification for one or more of the cyber security components so that the first LLM of the one or more LLMs can understand how to make API requests, where the training also included training on capabilities of each of the one or more of the cybersecurity components including what type of information can be found by communicating with each particular cybersecurity component as well as how to get that information through an API request.

14. The method of claim 10, comprising:

providing a first LLM that has been trained to take in a specification description of one or more of the APIs and turn the specification of one or more of the APIs into a set of endpoints and their associated parameters and available information that a trained deep learning model in the LLM will then use to call the cybersecurity components.

15. The method of claim 10, comprising:

providing a first LLM that has a query interface, where the first LLM of the one or more LLMs with its training on the cyber security information combined with its training to go through the APIs to obtain additional knowledge from the cyber security components creates a large cyber security knowledge base that allows the first LLM of the one or more LLMs to act as a search engine, in response to a user's query to the query interface, to obtain and provide detailed understandings of the cyber security information.

16. The method of claim 10, comprising:

providing a first LLM that has a user interface, where an end user is able to select at least one of a term and a phrase, displayed on the user interface, as a query input to the first LLM of the one or more LLMs in order to cause the first LLM of the one or more LLMs to explain and provide additional details on the selected term and/or phrase.

17. The method of claim 10, comprising:

providing one or more of the cybersecurity components, which are configured to provide a list of all of the breaches and their severity scores as well as cyber threats trending currently in response to a first API request, to a first LLM, and then the first LLM of the one or more LLMs is trained to provide the recommendations to prioritize the breaches over other breaches i) on a display and/or ii) in a printed report to the human.

18. A non-transitory storage medium including software that, upon execution by a processor, is configured to perform operations, comprising:

using one or more large language models (LLMs) to communicate and cooperate with one or more cybersecurity components via one or more Application Program Interfaces (APIs) to receive cyber security information being produced by the one or more of the cybersecurity components and then to apply language generation functionality in order to assist a human in an understanding of the cyber security information being produced by the cybersecurity components, and then also to provide recommendations to prioritize breaches over other breaches in a native human friendly format for the human, and where the one or more cybersecurity components configured to cooperate with the LLMs include i) a cyber security appliance with a cyber threat detect engine to detect a cyber threat in one or more of an email system, an Information Technology network, a cloud network, and any combination thereof, ii) a proactive threat notification service to publicize new and ongoing cyber threats, iii) a cyber threat autonomous response engine to take one or more actions to mitigate a detected cyber threat, iv) a cyberattack simulator to simulate a cyberattack, v) a cyber-attack restoration engine to restore network components back to an operational state prior to the cyberattack, and vi) an artificial intelligence-based cyber threat analyst module to investigate a chain of two or more anomalies linked to each other over a time frame of examination spanning two or more days; and wherein the one or more LLMs are trained to do tasks on behalf of a user and provide human readable summaries, including i) summarization and prioritization of breaches, ii) launching an investigation using the one or more APIs to find out information, and then iii) utilizing language capabilities of the LLMs to rephrase existing textual material to make the information more readily understandable to a larger audience of human end users.

* * * * *